March 22, 1960 W. R. AYLWARD ET AL 2,930,027
BINARY ENCODED INFORMATION MATCHER CIRCUIT
Filed March 5, 1958
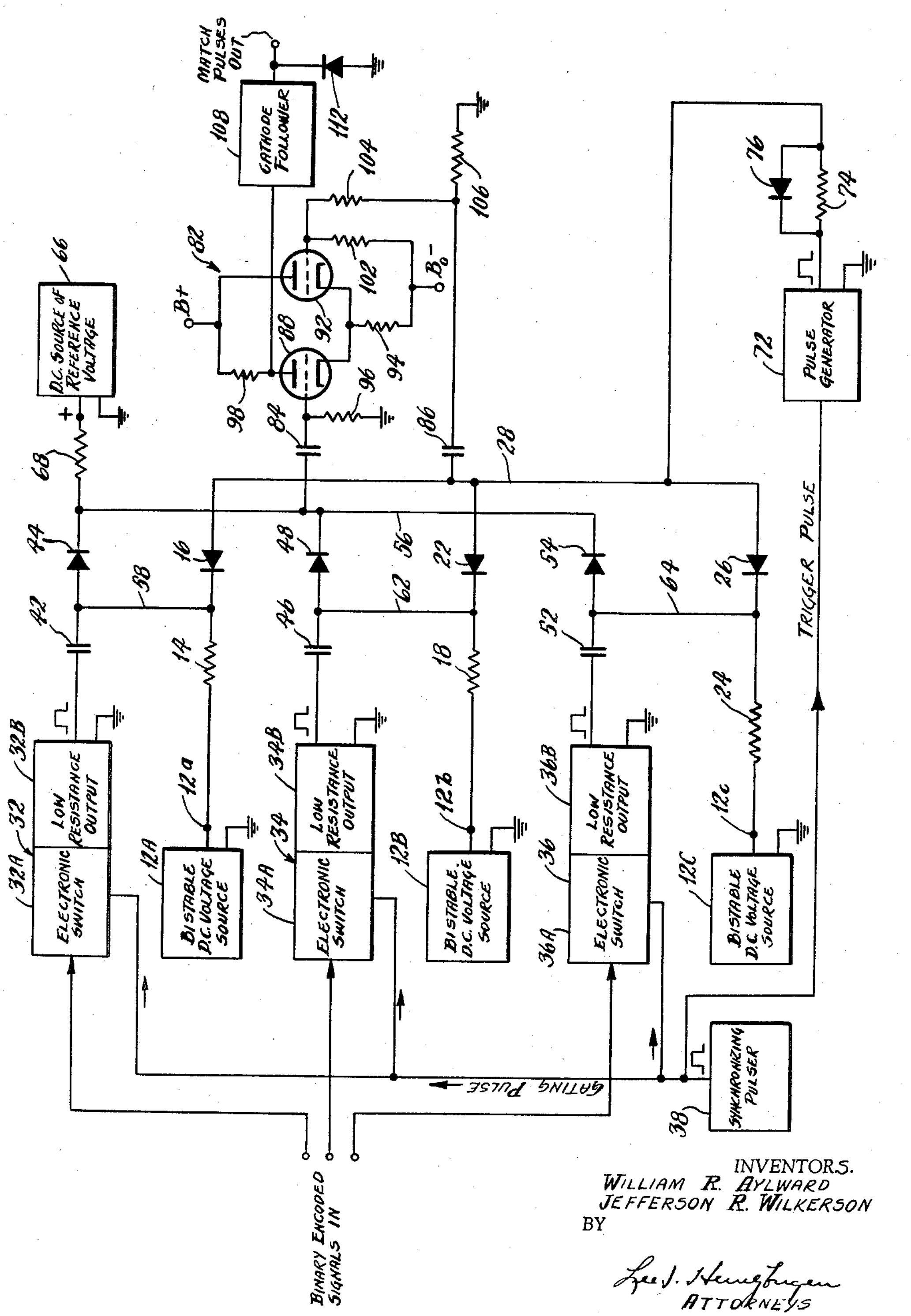
INVENTORS.
WILLIAM R. AYLWARD
JEFFERSON R. WILKERSON
BY
Lee J. Hengfingen
ATTORNEYS 2,930,027

BINARY ENCODED INFORMATION MATCHER CIRCUIT

William R. Aylward, Bellmore, and Jefferson R. Wilkerson, Westbury, N.Y., assignors, by mesne assignments, to the United States of America as represented by the Secretary of the Navy Application March 5, 1958, Serial No. 719,461

1 Claim. (Cl. 340—149)

This invention relates to a binary encoded information matcher circuit and more particularly to a binary encoded information matcher circuit for comparing successive incoming bits of information encoded into binary form with a stored bit of information encoded into binary form and for producing a match pulse when an incoming bit of information matches the stored bit of information.

An object of this invention is to provide a matcher circuit that can store a particular bit of information encoded in binary form and that compares successive incoming bits of information encoded in binary form with the stored bit of information and responds to each incoming bit of information that matches the stored bit of information.

A further object is to provide a matcher circuit in accordance with the preceding object and that is relatively inexpensive, easy to fabricate and service and reliable in operation.

Other objects and many of the attendant advantages of this invention will be readily appreciated as the same becomes better understood by reference to the following detailed description when considered in connection with the accompanying drawings wherein:

The single figure illustrates a schematic circuit diagram of an embodiment of this invention partly in block diagram form.

The embodiment of this invention illustrated in the drawing includes three substantially identical binary signal channels. These channels include substantially identical bistable D.C. voltage sources 12A, 12B and 12C, each having a pair of output terminals, one of the output terminals of each being connected to a source of reference potential hereinafter referred to as ground. Each of the other terminals 12*a*, 12*b*, and 12*c* respectively is either at substantially ground potential or at one predetermined potential above ground. Many conventional devices can perform this function. A battery in combination with a two position switch is one example of a device for performing this function. Another example is a bistable flip-flop. Still another example is a series-connected constant-voltage direct-current supply, a thyratron type tube, an open-close switch and a resistor to provide one of the desired output voltages when the gas tube is ionized and the other of the desired output voltages when the gas tube is not ionized. The flip-flop and the gas tube arrangements have the advantages that they are operable electronically from one state to the other, and do not require a plurality of batteries that can occupy excessive chassis space. The gas tube arrangement has the additional advantage of requiring only one tube as compared to two tubes for the flip-flop, thereby occupying less chassis space and using less filament heating power.

Resistor 14 and diode 16 are connected in series with the terminal 12*a*. Resistor 18 and diode 22 are connected in series with terminal 12*b*. Resistor 24 and diode 26 are connected in series with terminal 12*c*. The anodes of diodes 16, 22, and 26 are connected in common by a lead 28.

For each of the bistable D.C. voltage sources 12A, 12B, and 12C, there is provided an input circuit 32, 34, and 36 respectively; these circuits are substantially identical. Each of the input circuits includes a conventional electronic switch 32A, 34A, and 36A respectively. The electronic switch may be a simple amplifier or coincidence circuit normally biased far beyond cutoff whereby a signal pulse input thereto produces no output. A synchronizing pulser 38 is connected to each electronic switch 32A, 34A, 36A. The synchronizing pulser 38 may be free running or driven from the source of input signals. When the synchronizing pulser 38 applies a gating pulse to the electronic switches, the cutoff bias of the latter is nullified for the duration of the gating pulse whereby signal pulse inputs thereto appear as outputs. The signal input ends of the electronic switches are adapted to be connected to respective pulse sources, not shown, that provide the incoming bits of information in binary form. For example, successive incoming bits of information in binary form may be derived from a succession of punched cards. Low resistance output decouplers 32B, 34B, and 36B respectively, e.g., cathode followers, are connected to the outputs of the electronic switches. The output terminals thereof are substantially at ground potential between gating pulses from pulser 38. If decoupling is not necessary, inductances of very low resistance may be used instead of cathode followers. Each binary encoded bit of information arrives at the inputs of the circuits 32, 34, 36 in the form of a pulse pattern; i.e., a pulse arriving at one or more of the circuits 32, 34, 36 and no pulse arriving at the other(s), or a pulse arriving at each of the circuits 32, 34, 36. The incoming pulses are of substantially the same amplitude. If needed, a diode limiter (not shown) may be connected at the outputs of the circuits 32, 34, and 36 to ensure that the pulses from these circuits are of uniform amplitude.

A condenser 42 and diode 44 are connected in series with the output end of low resistance output 32B; a condenser 46 and diode 48 are connected in series with the output of low resistance output 34B; a condenser 52 and diode 54 are connected in series with the output of low resistance output 36B. The cathodes of diodes 44, 48, and 54 are connected in common by a conducting lead 56. A conducting lead 58 is connected from the junction of condenser 42 and diode 44 to the junction of resistor 14 and diode 16. A conducting lead 62 is connected from the junction of condenser 46 and diode 48 to junction of resistor 18 and diode 22. A conducting lead 64 is connected from the junction of condenser 52 and diode 54 to the junction of resistor 24 and diode 26. A resistor 68 connects a D.C. source of reference voltage 66 to the lead 56 whereby each of the diodes 44, 48, and 54 can conduct only when the anode is at a higher potential than that of source 66.

The bistable D.C. voltage sources provide zero output voltage in one operating condition and one predetermined output voltage in the other of their two operating conditions, the said predetermined output voltage being about equal to or the same order of magnitude as the amplitude of the pulses obtained at the outputs of circuits 32, 34, and 36.

Between gating pulses from synchronizing pulser 38, no pulses pass through input circuits 32, 34, and 36. Since the outputs from circuits 32, 34, 36 are derived across either resistances or low-resistance inductances that are grounded at one end as described previously, the left sides of condensers 42, 46, and 52 are at ground potential or at substantially ground potential between gating pulses. If the bistable D.C. voltage source 12A is in the operating condition for zero voltage output, the condenser 42 is uncharged between gating pulses. On the other hand, if bistable D.C. voltage source 12A is the other of its two stable operating conditions, the condenser 42 is charged to the voltage corresponding to the other operating condition of bistable D.C. source 12A. Similarly, condensers 46 and 52 are either uncharged or charged depending upon the selected one of the two operating conditions for bistable D.C. voltage sources 12B and 12C respectively.

During any gating pulse, if there is no pulse input to circuit 32, the voltage across the plates of condenser 42 is unchanged. Similarly, if during a gating there is no pulse input to circuit 34, the voltage across condenser 46 is unchanged, and if there is no pulse input to circuit 36, the voltage across condenser 52 is unchanged. Conversely, if during any gating pulse there is a pulse input to circuit 32, the left side of condenser 42 is raised to a potential corresponding to the amplitude of the pulse output of circuit 32 and because the voltage across a condenser cannot change instantaneously, the potential of the right hand side of condenser 42 is changed instantaneously by the same amount as is the left hand side of condenser 42; similarly if there is a pulse input to circuit 34 or circuit 36, the right hand side of condenser 46 or condenser 52 respectively is changed instantaneously by an amount equal to the amplitude of the pulse from circuit 34 or circuit 36.

If the bistable D.C. voltage source 12A is set in the operating condition for zero voltage output when a gating pulse is generated by synchronizing pulser 38, and if during the gating pulse no signal pulse arrives at input circuit 32, the anode of diode 44 and the cathode of diode 16 are at ground potential before and during the gating pulse from the synchronizing pulser 38. However, if during the gating pulse a signal pulse does arrive at and pass through the input circuit 32, the anode of diode 44 and the cathode of diode 16 is raised instantaneously to the voltage equal to the amplitude of the pulse from input circuit 32. If the bistable D.C. voltage source 12A is set in its other operating condition wherein it provides the predetermined output voltage mentioned earlier in this description, and a gating pulse is generated by synchronizing pulser 38, and if during the gating pulse no signal pulse arrives at input cicruit 32, the potential of the anode of diode 44 and of the cathode of diode 16 are substantially equal to the aforesaid predetermined output voltage of bistable D.C. voltage source 12A before and during the gating pulses; however, if during the gating pulse a signal pulse does arrive at and pass through the input circuit 32, the anode of diode 44 and the cathode of diode 16 is raised instantaneously from the potential corresponding to the output voltage of bistable D.C. voltage source 12A to the potential that is equal to the sum of the output voltage and bistable D.C. voltage source 12A and the amplitude of the pulse from input circuit 32.

The relationship of bistable D.C. voltage source 12B, input circuit 34, and diodes 48 and 22 and the relationship of bistable D.C. voltage source 12C, input circuit 36, and diodes 54 and 26 correspond to the relationship set forth above of bistable D.C. voltage 12A, input circuit 32, and diodes 44 and 16. Therefore during a gating pulse, the anode of diode 44 and the cathode of diode 16, the anode of diode 48 and the cathode of diode 22, and the anode of diode 54 and the cathode of diode 26, respectively, are at one of four possible potentials. The anode of diode 44 and the cathode of diode 16 are taken as illustrative. During a gating pulse the anode of diode 44 and the cathode of diode 16 either are at ground potential or are at the potential equal the aforesaid predetermined voltage output of bistable D.C. voltage source 12 when the latter is set in its other operating condition, or are at the potential equal to the amplitude of a pulse from circuit 32, or are at the potential equal to the sum of the aforesaid particular voltage output of bistable D.C. voltage source 12 plus the amplitude of a pulse from circuit 32.

A D.C. source of reference voltage 66 is connected at its negative terminal to ground and its positive terminal is connected by a resistor 68 to the lead 56. The terminal voltage of D.C. source 66 is equal to or slightly greater than the larger one of (*a*) the pulse amplitude obtainable from circuits 32, 34, and 36, and (*b*) the other than zero output voltage of bistable D.C. voltage sources 12A, 12B, and 12C; the terminal voltage of D.C. source 66 must be considerably less than the sum of (*a*) and (*b*). Therefore, no current flows through resistor 68 unless the potential of at least one of the anodes of the diodes 44, 48, and 54 is raised to the potential corresponding to the sum of the output voltage from a bistable D.C. voltage source 12A, or 12B or 12C and the amplitude of a pulse from an input circuit 32, or 34, or 36.

A conventional type of pulse generator 72 e.g., a single shot multivibrator, is connected at its input end to the synchronizing pulser 38. A resistor 74, bridged by a diode 76, connects the output terminal of pulse generator 72 to lead 28. The diode 76 ensures that the potential of lead 28 follows the trailing edge of each pulse generated by pulse generator 72. The pulse generator 72 generates a substantially rectangular pulse each time it is triggered by the synchronizing pulser 38. The duration of the pulses generated by pulse generator 72 are equal to or somewhat longer than the pulses from synchronizing pulser 38; the leading edges of the generated pulses are substantially coincident with those from synchronizing pulser 38. The amplitude of the generated pulses is less than the amplitude of pulses from input circuits 32, 34, 36 and is less than the aforesaid predetermined voltage output of bistable D.C. voltage sources 12A, 12B, 12C or is equal to the lesser of the two. A pulse amplifier may be used instead of the pulse generator 72 in which case the pulse output length therefrom would be substantially the same as pulse input width thereto.

Pulses generated by pulse generator 72 are appreciably attenuated by resistor 74 when the potential of one or more of the cathodes of diodes 16, 22, and 26 is at substantially ground potential. This occurs when one or more bistable D.C. voltage sources are set for zero voltage output and during a gating pulse from synchronizing pulser 38 no signal pulses arrive at the input circuit(s) corresponding to the bistable D.C. voltage source(s) set for zero voltage output. Current flows through resistor 68 when one or more of the bistable D.C. voltage sources 12A, 12B, 12C is set to provide the aforesaid predetermined output voltage and at least one of the corresponding input circuit receives an input pulse. When this condition occurs the potential of lead 56 rises by at least the same amount as the rise in potential in lead 28 because as mentioned previously the amplitude of pulses generated by pulse generator 72 is no greater than the amplitude of a pulse from input circuits 32, 34, and 36. Current can flow through both the resistors 68 and 74 when one of the above-described conditions prevails in one of the three binary channels and the other of the above described conditions prevails in another of the three binary channels.

A match pulse producing circuit 82 is coupled to lead 56 by means of a condenser 84 and is coupled to lead 28 by means of a condenser 86. The circuit 82 includes first and second substantially identical triodes 88 and 92 connected through a common cathode resistor 94 to a source of negative potential $B_0-$. A grid resistor 96 connects the grid of triode 88 directly to ground and a plate load resistor 98 connects the plate of the triode 88 to a B+ supply. A voltage divider including series-connected resistors 102, 104, and 106 is connected between the source of negative potential $B_0-$ and ground and the grid of triode 92 is connected to the junction of resistors 102 and 104. The plate of triode 92 is connected directly to B+. A cathode follower 108 is connected to the plate of triode 88. Triode 88 is normally conductive and triode 92 is normally cutoff. The amount of grid bias on triode 92 is so related to the amplitude of pulses generated by pulse generator 72 that if lead 28 is raised in potential by an amount substantially equal to the amplitude of a pulse generated by pulse generator 72 and the potential of the grid of triode 88 continues unchanged, the triode 92 is rendered conductive and current flow through triode 88 is substantially reduced or cutoff. The resistor 106 is many times larger than resistor 74 so that pulses are not unduly attenuated in resistor 74 when none of the diodes 16, 22, and 26 conduct.

When any of the diodes 44, 48, 54 conducts, the operating condition of circuit 82 is substantially the same as the normal operating condition, that is, triode 92 is nonconductive and triode 88 conducts. However, if the circuit design is such that current flow through tube 88 is increased significantly under the above conditions, a negative pulse is generated at the plate of triode 88. Since a negative pulse serves no useful purpose, it is shunted to ground by diode 112. When none of the diodes 44, 48, 54 conduct but any one of the diodes 16, 22, 26 conduct, the operating condition of the circuit 82 is the normal operating condition, that is, triode 92 remains nonconductive. However, when none of the diodes 16, 22, 26, 44, 48, 54 conduct during the interval of a pulse generated by synchronizing pulser 38, the operating condition of circuit 82 changes, that is, triode 92 is rendered conductive for approximately the interval of the pulse and a match pulse is obtained from the output of the cathode follower 108.

In operation, this circuit can be used to compare each of a plurality or succession of incoming bits of information with a reference bit of information provided the information can be encoded in binary form. Digital information is the most straightforward example of information that can be readily encoded in binary form. Those skilled in the art know how to express other than digital information in binary form; since the details of binary encoding are not essential to this invention, they are not discussed here. This circuit shows only three binary channels; as many binary channels as are necessary can be used in this invention. However, it is important that the diodes 16, 22, 26 have a very high back resistance particularly if there is a large number of binary channels. Though vacuum diodes have the disadvantage of requiring a filament supply they will have to be used if the back resistance of the diodes is not sufficiently high.

To store the reference bit of information in binary encoded form, each of the bistable D.C. voltage sources 12A, 12B, 12C is set in one of their two operating conditions. Assume that the reference information is expressed by setting bistable sources 12A and 12B for zero output and bistable source 12C in the operating condition providing the aforesaid predetermined voltage output. If the incoming bit of information matches the reference bit of information it is necessary that the binary encoded input to circuits 32, 34 and 36 be as follows: a pulse input to circuit 32, a pulse input to circuit 34, no pulse input to circuit 36, concurrent with a gating pulse from synchronizing pulser 38. Reduced to binary terms, if the operating condition for the bistable D.C. voltage source for zero output voltage corresponds to the binary symbol 1 and the other operating condition thereof corresponds to the binary symbol 0, then in the binary encoded incoming bits of information, a pulse would correspond to the binary symbol 1 and the absence of a pulse would correspond to the binary symbol 0. The symbols 1 and 0 in the above discussion are in accordance with conventional usage in the art.

Though circuit 82 as described herein is essentially a two stage cathode coupled amplifier a single stage amplifier can be adapted for the same purpose; in the latter the leads 56 and 28 would be coupled to the grid and cathode circuits of the single tube circuit.

In the described embodiment positive voltages are utilized. The same results can be achieved by reordering the circuit for negative voltages, that is negative input pulses, etc.

Obviously many modifications and variations of the present invention are possible in the light of the above teachings. It is therefore to be understood that within the scope of the appended claim the invention may be practiced otherwise than as specifically described.

We claim:

A binary encoded information matcher circuit that stores a reference bit of information encoded in binary form and accepts bits of information encoded in binary form, and generates a matching signal whenever an incoming bit of information matches the reference bit of information; said matcher circuit comprising: a matching signal source that has a normal operating condition in which there is not matching signal output therefrom and having activator and inhibitor inputs whereby if an activating pulse is coupled into the activator input and no inhibiting pulse is coupled into the inhibitor input, a matching signal is generated, and if no pulse is coupled into either input or if an inhibiting pulse is coupled into the inhibitor input with or without an activating pulse coupled into the activator input no matching signal is generated; means for providing said activating pulse each time it is pulsed, said means being normally inactive; a resistor connected in series with said activating pulse means and alternating current coupled at its other end to the activator input of said matcher signal source; a direct current reference source, that provides a voltage no less than the amplitude of pulses from said activating pulse means, a resistor connected at one end to said direct current reference source and alternating current coupled at its other end to the inhibitor input of said matcher signal source; a plurality of binary channels each of which includes: a bistable direct current voltage source for providing an output voltage in one of its operating conditions that is no greater than the voltage provided by said direct current reference source but is no less than the amplitude of activating pulses and for providing a substantially lower output voltage in the other of its operating conditions, an electronic switch means terminating in a low resistance output for accepting binary code pulses and operative only during input gating pulses thereto for providing output pulses corresponding to input binary code pulses, the amplitude of the output pulses being no greater than the voltage of said direct current reference source and no less than the amplitude of said activating pulse and of the same polarity, a resistor in series with said bistable direct current voltage source, a condenser connected between said low resistance output and said last-mentioned resistor, one diode connected at its anode end and a second diode connected at its cathode end to the junction of the last-mentioned resistor and condenser, the other ends of said diodes connected to the alternating current couplings leading into the inhibitor input and the activator input respectively, of said matching signal source; and pulse means operating at intervals for concurrently gating all of said electronic switch means and pulsing said means that generates the activating pulse; whereby said matching signal source provides a match signal during each activating pulse during which a binary pulse arrives at each electronic switch where the corresponding bistable direct current voltage source is set for the lesser of its two voltage outputs and no binary pulse arrives at each electronic switch where the corresponding bistable direct current voltage source is set for the higher of its two voltage outputs.

References Cited in the file of this patent

UNITED STATES PATENTS 2,845,220 Bensky ---------------- July 29, 1958